US012595784B2

(12) United States Patent
Ciezobka

(10) Patent No.: US 12,595,784 B2
(45) Date of Patent: Apr. 7, 2026

(54) VERTICAL AND HELICAL WELL DESIGNS FOR ENHANCED GEOTHERMAL SYSTEMS

(71) Applicant: GTI ENERGY, Des Plaines, IL (US)

(72) Inventor: Jordan Ciezobka, Addison, IL (US)

(73) Assignee: GTI ENERGY, Des Plaines, IL (US)

( * ) Notice: Subject to any disclaimer, the term of this patent is extended or adjusted under 35 U.S.C. 154(b) by 0 days.

(21) Appl. No.: 18/225,215

(22) Filed: Jul. 24, 2023

(65) Prior Publication Data

US 2024/0026863 A1 Jan. 25, 2024

Related U.S. Application Data

(60) Provisional application No. 63/391,832, filed on Jul. 25, 2022.

(51) Int. Cl.
*F03G 4/00* (2006.01)
*E21B 43/26* (2006.01)
*E21B 43/30* (2006.01)

(52) U.S. Cl.
CPC ............... *F03G 4/00* (2021.08); *E21B 43/26* (2013.01); *E21B 43/30* (2013.01)

(58) Field of Classification Search
CPC ........................................... E21B 43/26
See application file for complete search history.

(56) References Cited

U.S. PATENT DOCUMENTS

| | | | |
|---|---|---|---|
| 3,878,884 A | 4/1975 | Raleigh | |
| 4,022,279 A * | 5/1977 | Driver | E21B 43/24 166/308.1 |
| 4,832,122 A * | 5/1989 | Corey | B09C 1/002 166/266 |
| 5,127,457 A * | 7/1992 | Stewart | E21B 37/06 166/279 |
| 2006/0157242 A1 | 7/2006 | Graham et al. | |
| 2012/0018120 A1 | 1/2012 | Danko | |
| 2014/0144623 A1 | 5/2014 | Pyecroft et al. | |
| 2015/0008001 A1* | 1/2015 | Hay | E21B 43/305 166/50 |
| 2019/0128068 A1* | 5/2019 | Danko | E21B 47/022 |
| 2022/0154978 A1 | 5/2022 | Mcbay | |
| 2023/0323762 A1* | 10/2023 | Nguyen | E21B 43/267 166/63 |

FOREIGN PATENT DOCUMENTS

CN 113513297 A 10/2021

OTHER PUBLICATIONS

Machine translation of CN113513297A, accessed May 21, 2024. (Year: 2024).*
PCT International Search Report, Form PCT/ISA/210, for International Application PCT/US2023/028532, Oct. 31, 2023 (04 pages).
PCT Written Opinion of the International Searching Authority, for International Application PCT/US2023/028532, Oct. 31, 2023 (06 pages).

* cited by examiner

*Primary Examiner* — Jonathan R Matthias
(74) *Attorney, Agent, or Firm* — Pauley Erickson & Swanson

(57) ABSTRACT

A method and system of recovering heat from geothermal energy with a curved producing well extending around an injection well. The injection well is substantially vertical, and the producing well is helical about the injection well. The producing well extends through a plurality of geologic fractures about the injection well formed by multiple injections made through the injection well.

13 Claims, 3 Drawing Sheets

VERTICAL AND HELICAL WELL DESIGNS FOR ENHANCED GEOTHERMAL SYSTEMS

CROSS REFERENCE TO RELATED APPLICATION

This application claims the benefit of U.S. Provisional Application Ser. No. 63/391,832, filed on 25 Jul. 2022. The provisional application is hereby incorporated by reference herein in its entirety and is made a part hereof, including but not limited to those portions which specifically appear hereinafter.

BACKGROUND OF THE INVENTION

This invention relates generally to a system for recovering heat (geothermal energy), and more particularly, to a system and method for recovering heat using a well which is stimulated using single or multiple fluid injections to create fracturing extending radially from the wellbore. Fractures created using other stimulation techniques such as acoustic, thermal, or electromagnetic fracturing, can provide a similar effect.

Enhanced Geothermal Systems (EGS) extract heat via a producing (or recovery) well penetrating a geologic reservoir which may or may not contain natural or created subsurface fracture structures to which water (or other fluids) can be added through injection wells. Current EGS systems utilize horizontal or, sometimes, vertical or slant wells to inject fluid and collect fluid. However they generally are inefficient due to limited hydraulic communication between the wells, loss of injected fluid, and/or low fluid residence times. There is a continuing need for improved EGS systems.

SUMMARY OF THE INVENTION

A general object of the invention is to provide a system for recovering heat (geothermal energy), and more particularly, to a system and method for recovering heat in a well with fracturing, such as formed of multiple fractures that penetrate the geothermal reservoir, extending (e.g., radially) from the wellbore.

The present invention includes a curved, preferably helical, producing well. The helical well is preferably disposed around one or more vertical and/or slant injection wells.

The present invention further provides a system and method for recovering heat (geothermal energy) preferably using a vertical or slant well that is stimulated using multiple fluid injections to create fracturing extending from the injection wellbore, which may form a radial pattern. A helical or otherwise curved/looping producing well is drilled through the created fractures to extract heated fluid, which improves fluid transfer between the vertical injection well, the created fractures, and the producing well.

In embodiments of this invention, the method includes creating a geologic fracture structure about an injection well. A curved producing well is then drilled through the geologic fracture structure. In some embodiments, the method includes forming a plurality of fracture structures radially about the injection well and forming a curved producing well through each of the plurality of geologic fracture structures.

The multiple geologic fracture system can be provided by a plurality of separate and temporally spaced apart injections into the injection well. In embodiments, a second geologic fracture system is beneath a first geologic fracture system, each including a plurality of radial fractures, and the curved producing well extends through the first geologic fracture system and the second geologic fracture structure. The injection well can be divided into two (or more) injection zones to create the first geologic fracture system and the second geologic fracture system.

The invention further includes a method of recovering heat from geothermal reservoirs including: injecting a fluid through an injection well into a geothermal reservoir to create a geologic fracture structure within the geothermal reservoir, and collecting heated fluid in a producing well drilled through the geothermal stimulated reservoir with the well having a curved path or trajectory through the geologic fracture structure. The method can further include drilling an injection well, preferably vertically, for the injecting the fluid and drilling a producing well path, preferably helically, extending about the injection well and through the fracture structure.

The method can further include steps of forming a second geologic fracture structure beneath a first geologic fracture system, and extending the producing well path through both the first geologic fracture structure and the second geologic fracture structure. In embodiments, the method includes dividing the injection well into a plurality of injection zones, creating a geologic fracture structure about each of the injection zones of the injection well, and extending the curved producing well through the geologic fracture structure about each of the injection zones.

The invention further includes a system for recovering heat from geothermal reservoirs. The system includes an injection well extending into a geothermal reservoir rock, preferably vertical and extending in a direction of gravity, a plurality of fractures intersecting the injection well, and a producing well extending curved through the plurality of fractures. The producing well desirably curved around the injection well, and is preferably at least partially helical about the injection well. In embodiments, the injection well comprises a plurality of injection zones, each with a geologic fracture structure intersecting the injection zone, and the curved producing well extends about each of the injection zones.

The invention is useful for reducing extraction costs of geothermal energy, while making the process more efficient over current Enhanced Geothermal Systems (EGS). Embodiments of this invention include creating multiple fractures in a well and connecting these fractures with a helical producing well. The invention enables creating multiple fractures, with the ability to close some off as needed, and/or the ability to intersect the created fractures at multiple locations to enable higher injected fluid recovery fluid flow throughput.

Embodiments of this invention include several additional benefits. The method is generally less expensive than drilling two horizontal EGS wellbores. The method uses one vertical or slant injection well (new or existing) and one slant/curved/helical recovery (production) well. The heat recovery efficiency is typically higher due to the recovery well intersecting fractures in multiple locations, as opposed to just one with a horizontal well. Embodiments of the invention use an existing vertical/slant well, which has been fractured and can be refractured. In this case, one simply drills the helical recovery well. The helix can be much longer than a horizontal lateral, extending the residence time of the working fluid in the geothermal reservoir. The invention generally provides better control of where the injected fluid is going, as there is only one set of perforations. Also, one can add additional vertical zones with isolated tubing for each zone of injection.

Other objects and advantages will be apparent to those skilled in the art from the following detailed description taken in conjunction with the appended claims and drawings. The below-described drawings are schematic and therefore not to scale.

DESCRIPTION OF THE INVENTION

The present invention provides and uses a curved, preferably helical, producing well to increase efficiency in heat extraction for geothermal systems. The producing well is preferably disposed around a primary injection well, preferably a vertical or slant (e.g., between 10-90 degrees) injection well. The producing well increases the fluid flow through a fracture structure around the primary well.

Figure 1:
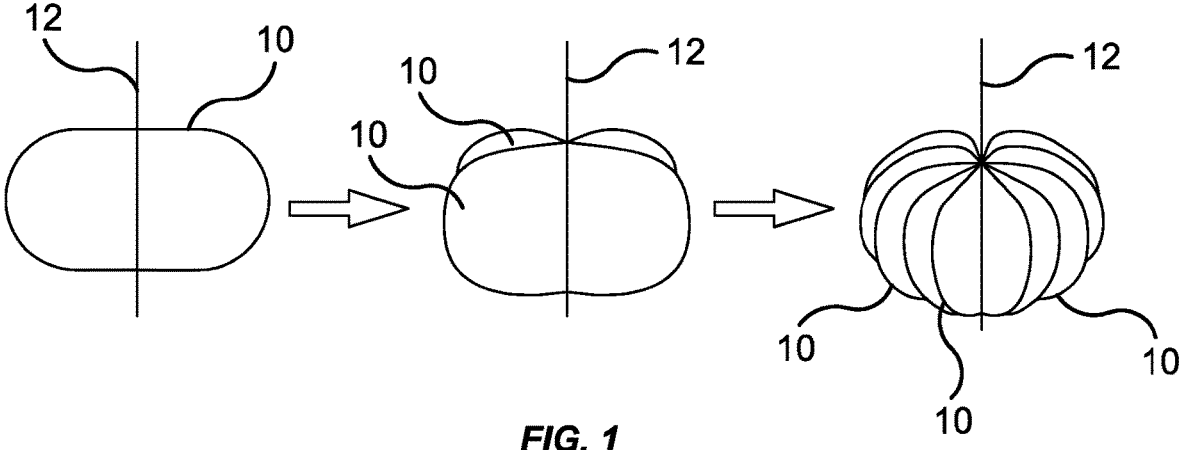
FIG. 1 representatively shows a fracture profile for single injection (single planar frac geometry), transitioning to multiple fractures by multiple injections (bowtie frac geometry), and finally to an ideal geometry (pumpkin shaped).

Embodiments of this invention create and/or use multiple radial fractures around a vertical or slant wellbore to improve fluid movement/transfer and thereby improve heat recovery. FIG. 1 shows a representative image of a single radial fracture 10 around wellbore 12. Multiple injections with pauses between injections, have been shown to increase the fluid production by 2 to 5 times over conventional fracturing, indicating that significantly more rock was stimulated than in single injection scenarios as shown in the middle representation. By adjusting various parameters of the fracture design and optimizing the injection schedule, a plurality of hydraulic fractures can be formed about, and desirably all around, the wellbore as shown in the last representation, providing complete radial stimulation. The final idealized fracture design is often referred to as a "pumpkin frac." This fracture structure is a functional equivalent of a fully stimulated cylinder of reservoir volume containing and centered on a vertical well 12.

The pumpkin frac configuration allows for greater reservoir contact, improved and additional fluid flow. The invention provides for additional bore path configurations in addition to the vertical wellbore to take advantage of, and further improve system efficiency with, the radial fracture stimulation.

Figure 2:
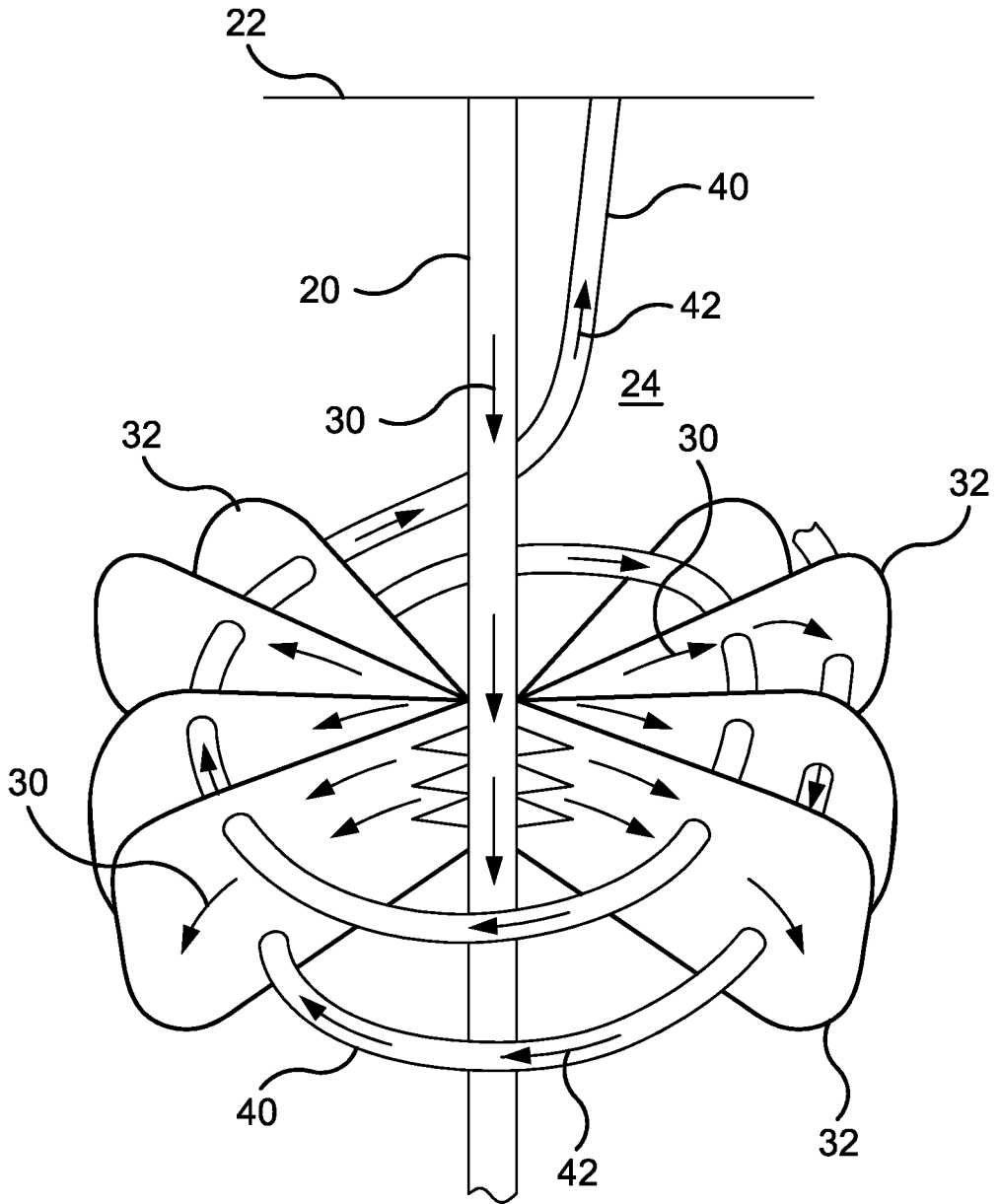
FIG. 2 schematically illustrates a well bore according to one embodiment of this invention.

FIG. 2 generally illustrates a method and EGS system according to embodiments of this invention. An injection well 20 is drilled from surface 22 to target geothermal formation 24, which typically has limited permeability and fluid content (i.e., "dry" rock). The geothermal reservoir is fracture stimulated through hydraulic fracturing, or other means, creating multiple fractures extending from the injection well. A working (or heat recovery) fluid 30, such as water, is injected into the injection well 20. The working fluid 30 is injected at sufficient pressure to fill the fracture structure system 32 within and around the geothermal reservoir 24. A second well, namely producing well 40, is drilled to intersect the system of fractures 32 and to extract the working fluid 30 as heated working fluid or produced fluid 42 from the geothermal reservoir.

The producing well of this invention desirably extends about the injection well, desirably curved or looping through the fracture structure. As shown in FIG. 1, the injection well 20 is vertical relative to gravity or the surface 22, but can also be slant, and the producing well 40 is helical about the injection well 20. As will be appreciated, variations of the angles and/or configuration of the two wells can vary, depending on need.

Figure 3:
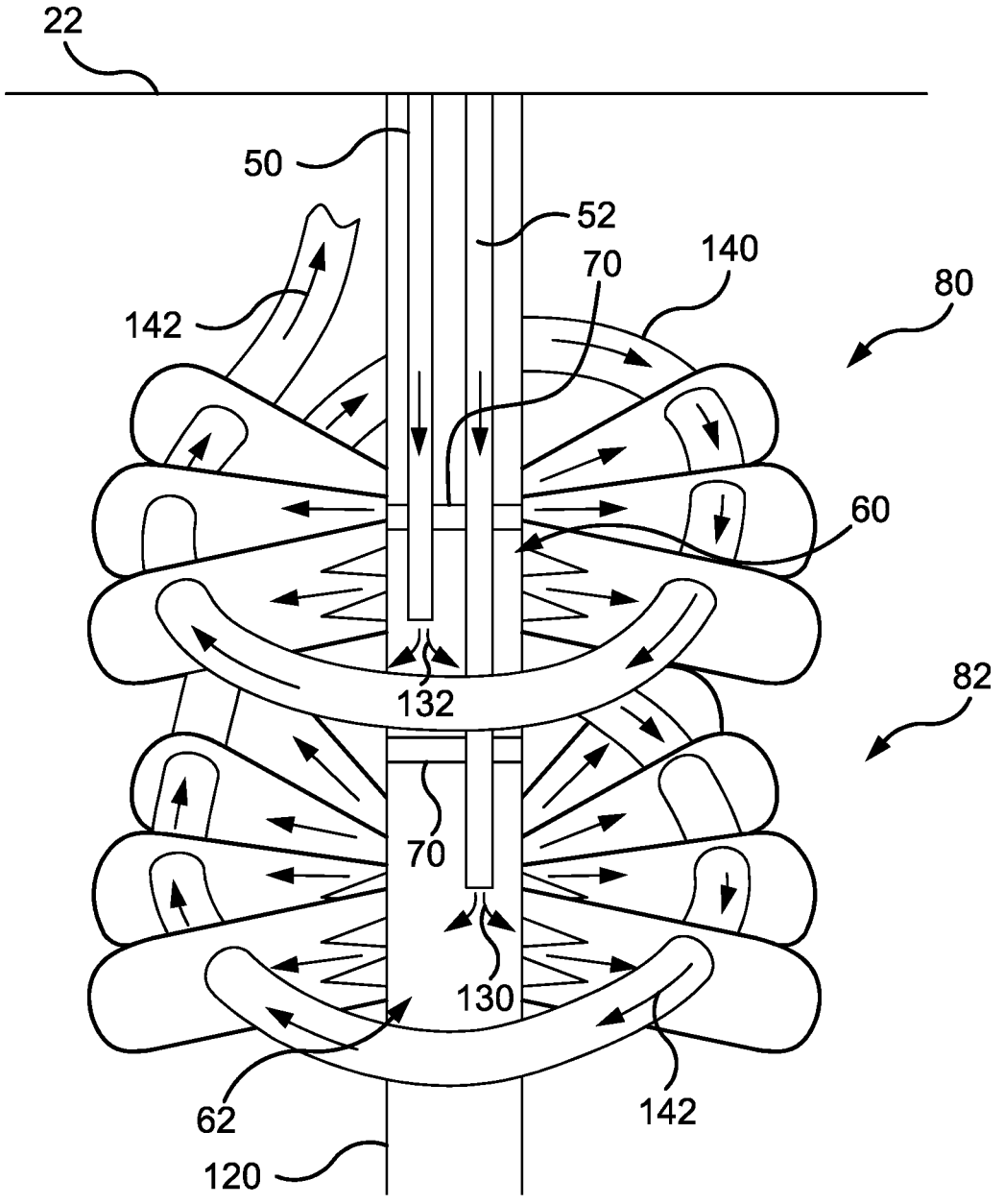
FIG. 3 schematically illustrates a well bore according to one embodiment of this invention.

FIG. 3 shows an embodiment with different injection zones along the injection well 120 for working fluid 130. Each zone includes an isolated injection, illustrated as using separate tubing 50, 52 for zones 60, 62, respectively. A barrier 70 or other stop can be used to isolate the injection zones 60, 62, etc. The upper barrier 70 can also be used to focus the upper injection in a desired fracking area. Injections in each isolated injection zone creates a 'separate' fracture structure 80 and 82. The producing well 140 and produced fluid 142 desirably extends through each of the fracture structures 70 and 72. Alternatively, more than one producing well can be used, such as one for each fracture structure.

The invention thus provides a new producing well configuration, by which heated fluid can be more readily obtained for EGS heat generation/extraction. The spiral or helical configuration of the return producing well increases contact through the fracture structure, while potentially reducing the number of wells and well-heads needed to intersect the fracture structure.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of recovering heat from geothermal reservoirs, the method comprising:

forming an injection well in a geothermal reservoir;

creating a geologic fracture structure in the geothermal reservoir about the injection well, wherein the geologic fracture structure comprises a plurality of radial fractures about the injection well, and creating the geological fracture structure comprises:

a first injection into the injection well creating a first radial fracture around a section of the injection well;

a second injection into the injection well creating a second radial fracture around the section of the injection well, and adjacent the first single radial fracture;

additional injections into the injection well creating additional radial fractures around the section of the injection well, and adjacent the first and second single radial fractures;

forming a curved producing well that is helical about the injection well and curved through each of the plurality of radial fractures;

injecting a heat recovery fluid into the injection well to fill the geologic fracture structure and recover heat energy; and

extracting a heated heat recovery fluid within the geologic fracture structure using the curved producing well.

2. The method of claim 1, wherein the injection well is substantially vertical.

3. The method of claim 1, further comprising:

forming a second geologic fracture structure beneath the geologic fracture system, the second geological fracture system comprising a second plurality of radial fractures about a second section of the injection well; and extending the curved producing well through the geologic fracture structure and curved through each of the second plurality of radial fractures of the second geologic fracture structure.

4. The method of claim 3, further comprising dividing the injection well into two injection zones to create the geologic fracture structure and the second geologic fracture structure.

5. The method of claim 1, further comprising:

dividing the injection well into a plurality of injection zones;

creating a geologic fracture structure about each of the injection zones of the injection well; and extending the curved producing well through the geologic fracture structure about each of the injection zones.

6. The method of claim 1, wherein the heat recovery fluid is water.

7. A method of recovering heat from geothermal reservoirs, the method comprising:

creating a geologic fracture structure in a geothermal reservoir about an injection well, wherein the geologic fracture structure comprises a plurality of radial fractures about the injection well, and creating the geological fracture structure comprises a plurality of separate injections through the injection well, each of the separate injections forming one of the plurality of radial fractures;

injecting water through the injection well into the geologic fracture structure to recover heat from the geothermal reservoir; and collecting heated water from the geologic fracture structure in a producing well path that is helical about the injection well and curved through each of the plurality of radial fractures in the geologic fracture structure.

8. The method of claim 7, wherein the injection well is generally vertical.

9. The method of claim 7, further comprising:

forming a second geologic fracture structure beneath the geologic fracture system; and extending the producing well path through both the geologic fracture structure and the second geologic fracture structure.

10. The method of claim 7, wherein the injection well is a slant well.

11. A system for recovering heat from geothermal energy, comprising:

an injection well extending into a geothermal reservoir rock;

a plurality of radial fractures intersecting the injection well;

a helical producing well extending curved through each of the plurality of radial fractures; and a supply of water configured to be injected in the injection well and recovered as heated water from the producing well.

12. The system of claim 11, wherein the injection well is vertical, extending in a direction of gravity.

13. The system of claim 11, wherein the injection well comprises a plurality of injection zones, each with a geologic fracture structure intersecting the injection zone, the curved producing well extends about each of the injection zones.

\* \* \* \* \*